Sept. 18, 1951 T. A. HUTSELL 2,568,632
FOAM CONTROLLING DISPENSER FOR EFFERVESCENT LIQUIDS
Filed Aug. 10, 1946 5 Sheets-Sheet 1
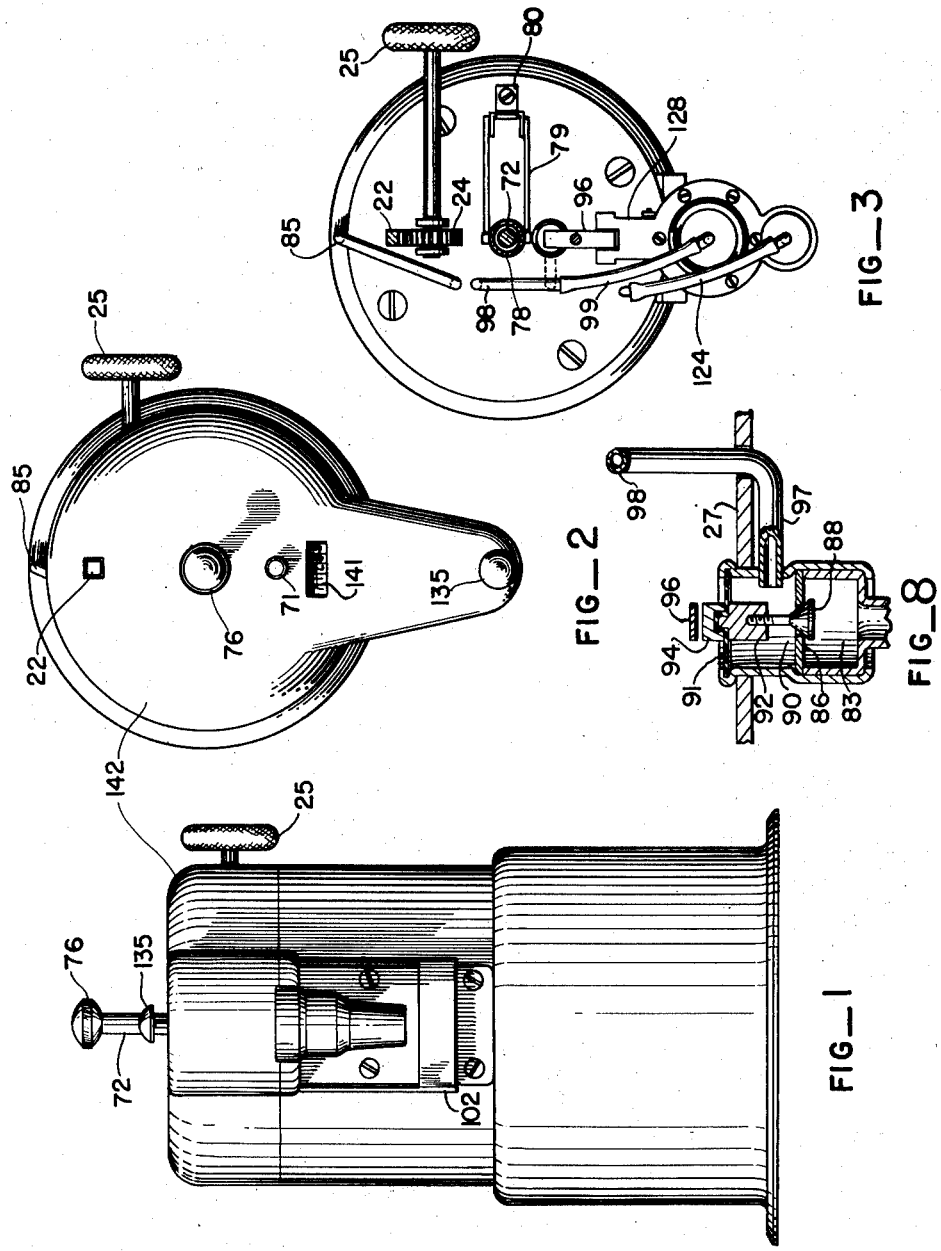
THOMAS A. HUTSELL
INVENTOR
BY *Smith & Tuck*
ATTORNEYS

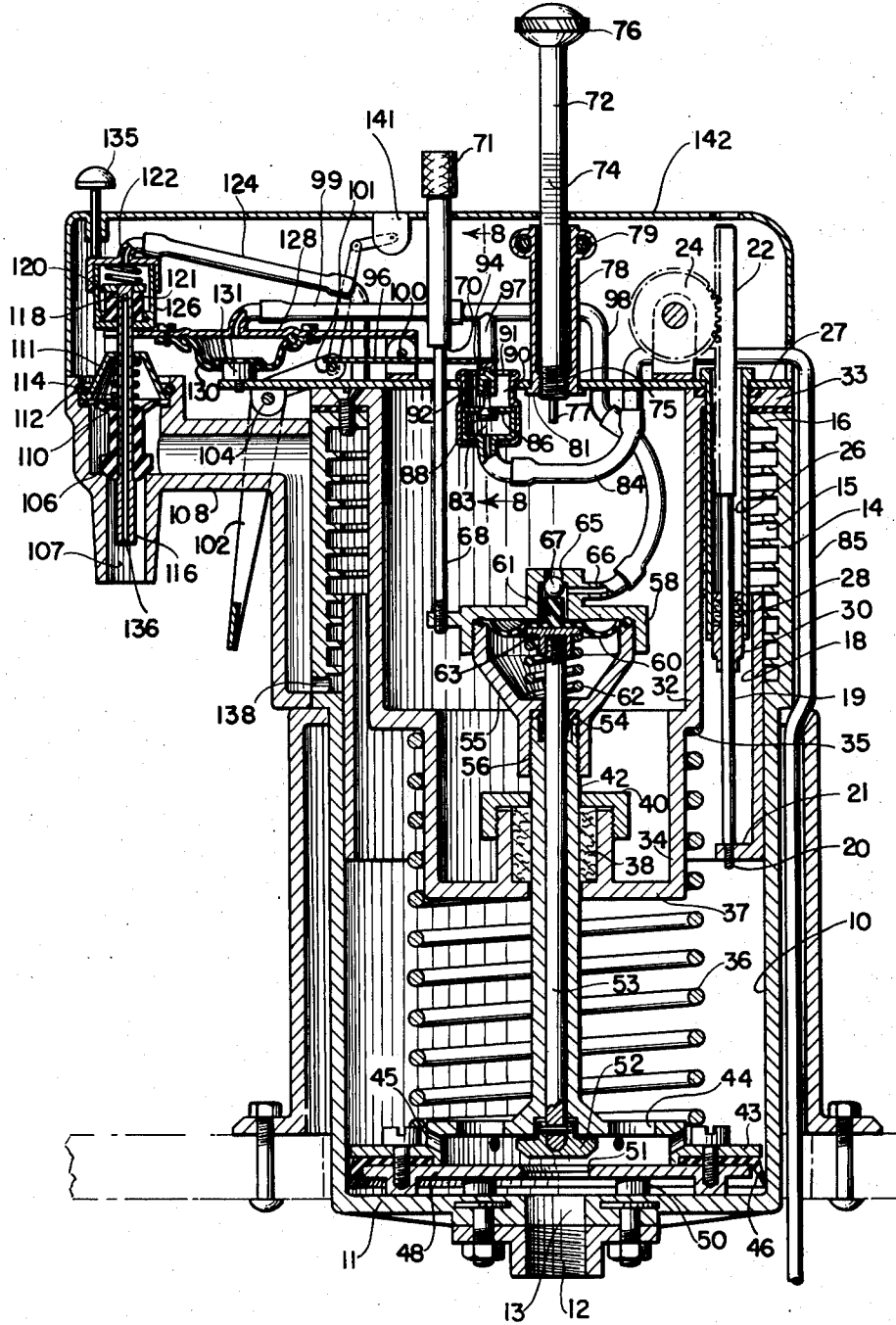
FIG_4

Sept. 18, 1951  T. A. HUTSELL  2,568,632
FOAM CONTROLLING DISPENSER FOR EFFERVESCENT LIQUIDS
Filed Aug. 10, 1946  5 Sheets-Sheet 5
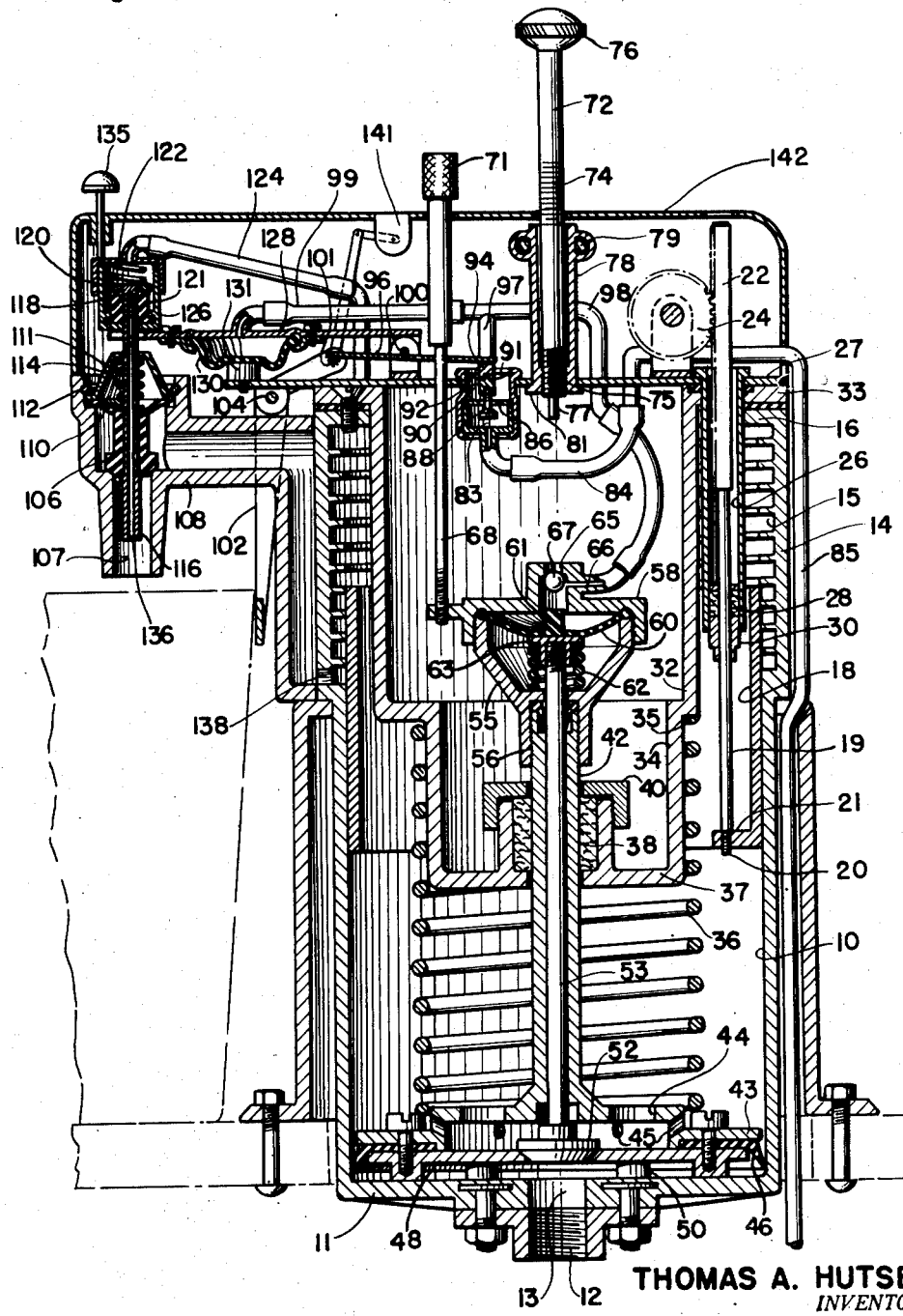
FIG_5
THOMAS A. HUTSELL
INVENTOR.
BY
*Smith & Tuck*
ATTORNEYS

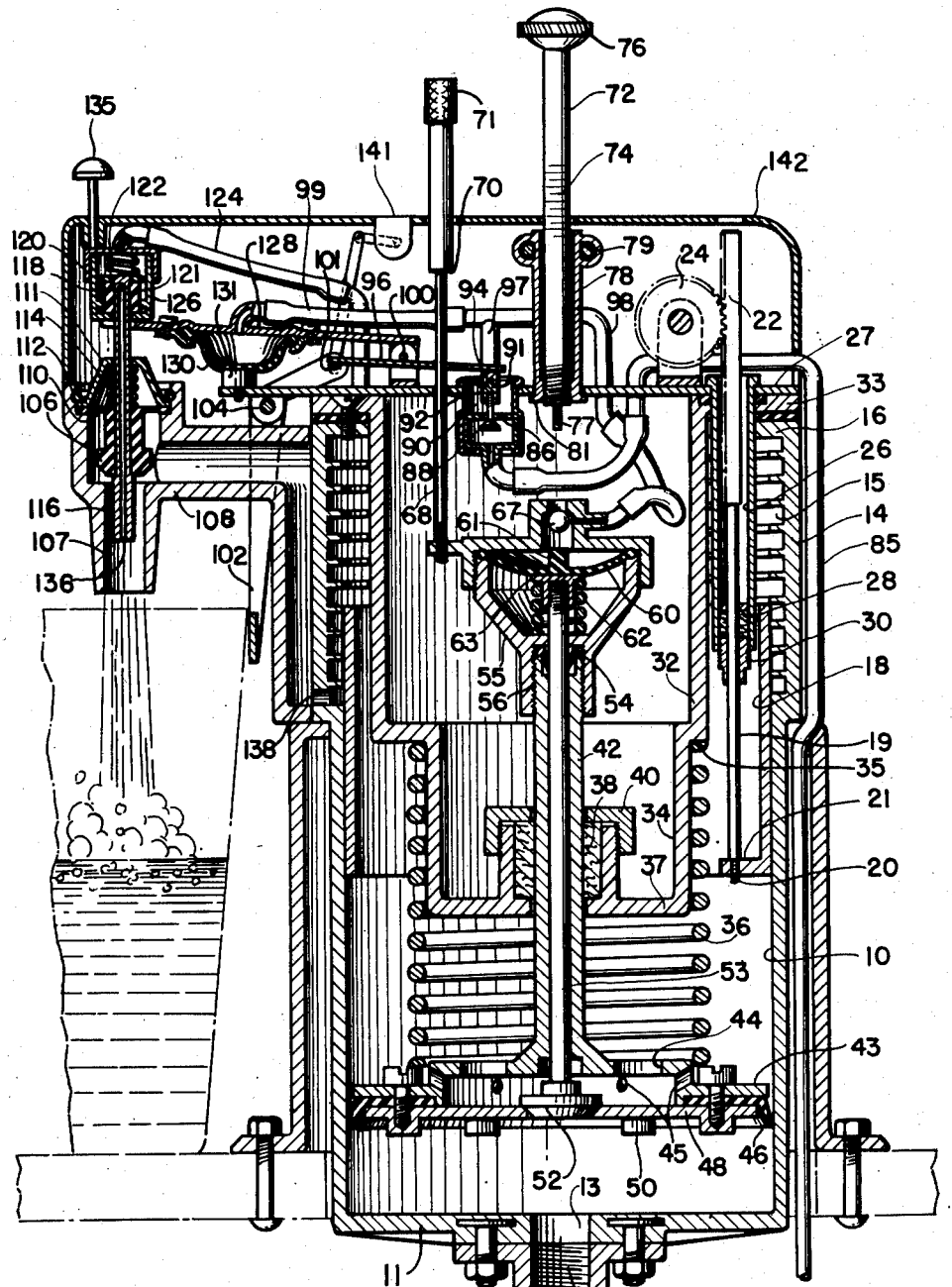
FIG—6

Sept. 18, 1951 T. A. HUTSELL 2,568,632
FOAM CONTROLLING DISPENSER FOR EFFERVESCENT LIQUIDS
Filed Aug. 10, 1946 5 Sheets-Sheet 5
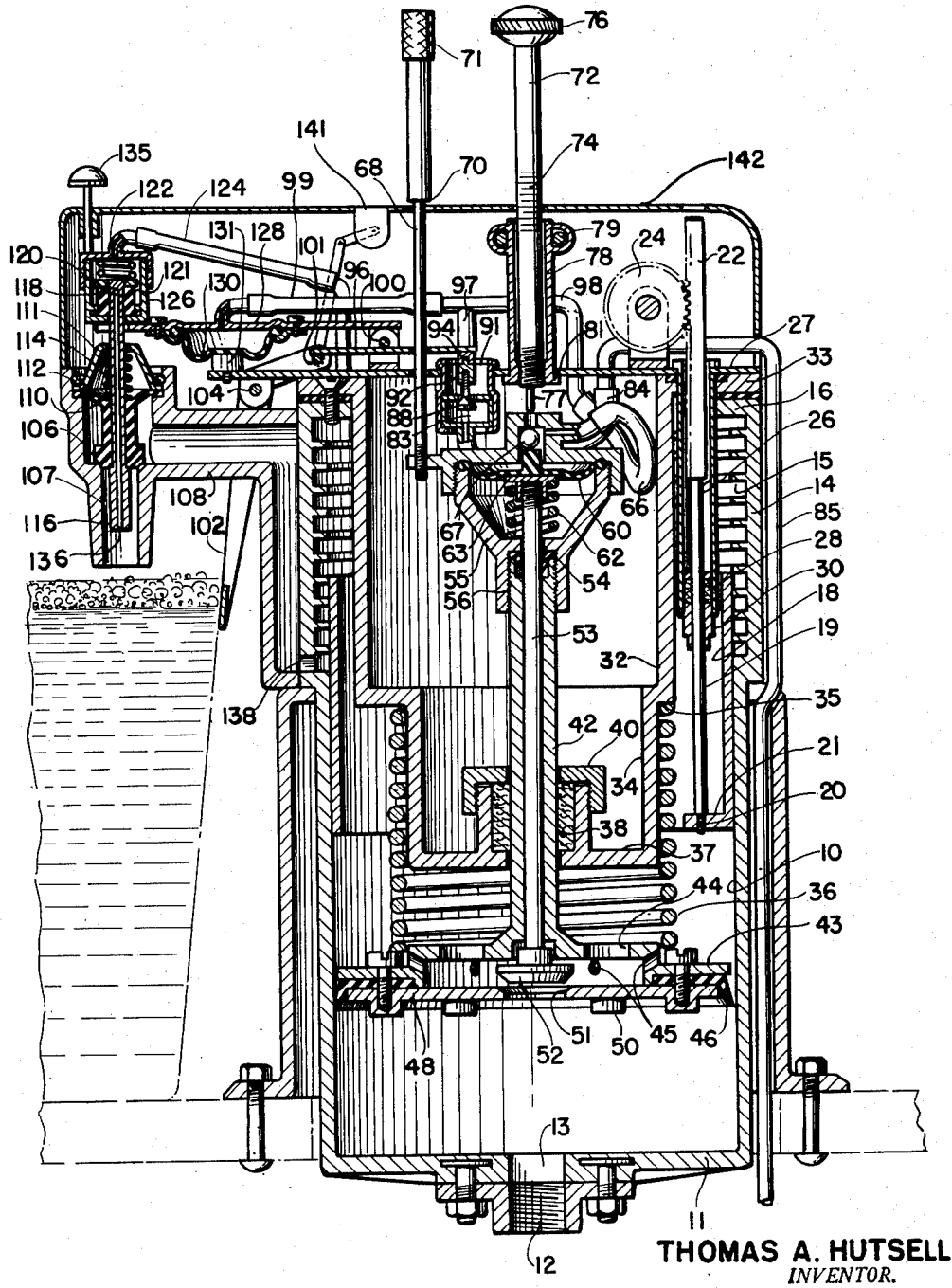
FIG_7
THOMAS A. HUTSELL
INVENTOR.
BY Smith & Tuck
ATTORNEYS Patented Sept. 18, 1951

2,568,632

UNITED STATES PATENT OFFICE 2,568,632

FOAM CONTROLLING DISPENSER FOR EFFERVESCENT LIQUIDS

Thomas A. Hutsell, Renton, Wash.

Application August 10, 1946, Serial No. 689,782

9 Claims. (Cl. 222—309)

My present invention relates to the art of dispensing devices for effervescent liquids and, more particularly, to a foam controlling dispenser for effervescent liquids.

Due to the unstable characteristics of draught beer, considerable losses in volume and quality are suffered by the retailer in handling and dispensing it with the presently available equipment. An essential ingredient of beer is carbon dioxide gas in solution. This gas is a preservative and contributes greatly to the palatability and healthful qualities of beer as a beverage. Any appreciable loss of this gas, in storage or in dispensing, results in a loss of both quality and volume.

At a sufficiently low temperature, approximately 31°, this gas is inert, and if the beer is quiescent it has little tendency to come out of solution and escape as a gas. This temperature, however, is well below the most desirable drinking temperature, and it is common practice to store and serve it at temperatures up to 15° higher.

In order to offset the tendency of the gas to come out of solution under the influence of these higher temperatures, and also to furnish a means of raising the beer to the dispensing faucet or draught arm, air or gas pressure is applied to the beer. If sufficient pressure is applied, in ratio to the temperature, most of the gas will remain in solution for a sufficient period of time. While pressure on the stored static beer will tend to retain the essential gas in solution, when the faucet is opened the pressure is abruptly dropped in the line and reduced to atmospheric at the nozzle, which causes a loss of gas from the solution. A sudden drop of pressure on the beer at ordinary serving temperature causes a condition in the beer that renders it more susceptible to loss of its contained gas than results when the same pressure reduction is effected gradually. The loss is increased by the agitation of the beer resulting from forcing it through the faucet. This rapid release of the contained gas not only means a loss of volume and quality, but often results in excessive foaming and an additional waste of beer and makes it impossible to draw servings of a uniform quantity and with the desired proportion of beer and foam.

The principal object of my present invention is an improvement in the art of drawing beer and other effervescent liquids and, more particularly, in regulating the amount of foam formed in drawing and in measuring predetermined quantities or servings of such liquids.

A further object of my invention is to provide a machine designed to replace the dispensing faucet or draught arm and which may be installed on, or in, present refrigerated storage facilities or may be manufactured as a part thereof.

A further object of my invention is to control the degree of foam production, as the amount of foam formed at a given temperature is determined by the pressure of the beer as it leaves the outlet nozzle. In my present device, this pressure is regulated by passing the beer through a restricted passage where a gradual reduction of pressure is effected. The longer the passage used, the lower the pressure at the discharge point. The maximum length of this passage is sufficient to effect control under all normal working conditions. A simple manual adjustment is provided to increase or decrease the length of the passage used to select any required degree of control.

A further object of my invention is to provide a cylinder, in which a piston is fitted, to be inserted in the line between the storage keg and the foam control. The stem of the piston extends through a packing in the end of the cylinder. The exterior end of this stem carries a mechanism which actuates the closing of the outlet nozzle valve. This mechanism can be set to close the outlet valve when the piston has been moved any predetermined distance by the flow of beer. The sole function of this piston stem is to operate the valve mechanism. The amount drawn is determined by the diameter of the cylinder and the distance the piston travels to operate the mechanism which closes the outlet valve and stops the flow of beer. Following the closing of the outlet valve, a by-pass valve in the piston is opened, allowing the piston to be returned to its starting point under the urgence of an energized spring.

A further object of my invention is to provide for additional consecutive drawings without further manual effort. Since beer on draught is always under either gas or air pressure, this pressure is utilized to operate the valving mechanism.

Air or gas pressure and the energized spring combine to furnish power to cause the machine to function as an engine mechanism which can be used to operate the machine continuously so that any desired number of consecutive metered amounts can be drawn, or it can be set to operate only part of the engine cycle, the other part of the cycle being completed by manually actuating the air admission valve by a slight pressure of the hand or the glass against a lever, thus drawing a single metered quantity. This arrangement provides easy and speedy operation since no further manual control is necessary after the machine is set in motion, whether it is set to draw only a single glass or for continuous operation, and both hands are left free. The discharge cycle of the operation can be stopped at any point desired by the manual control provided for this purpose. This enables the operator to draw any desired amount less than the quantity for which the machine is set to meter.

A further object of my invention is to provide an outlet pipe controlled by a manually operated bleeding valve at the highest point in the beer passage to bleed off any air or gas which might be trapped in the passage. The outlet end of this pipe is in the outlet nozzle of the machine, thus directing any liquid or foam downward into the beer box drain tray.

A further object of my arrangement is that when the beer passage is entirely full the bleeding valve may be opened to direct a fine stream of beer, under keg pressure, into a glass of beer which may not have the desired amount of foam on it. This will serve to agitate the beer in the glass and generate foam with a relatively small addition of beer.

Experience has shown that the amount of control required in handling beer is directly proportional to the temperature. Therefore, a further object of my invention is to avoid frequent adjustments of the control mechanism. My device is arranged to maintain substantially a uniform temperature throughout the system. Since the machine will, in some instances, be mounted on the exterior of the refrigerated beer storage box or room, and be exposed to room temperature, the beer contained in the machine would tend to rise in temperature in time. To offset this tendency, it is intended that in cases where the machine is mounted on the exterior of the box, it will be jacketed with a refrigerant, and this jacket will communicate with the refrigerated interior of the box.

As a further object of my machine, it is so designed that it can be quickly and thoroughly cleaned with steam or a solvent under pressure.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a front elevation of my dispenser;

Fig. 2 is a top plan view of my dispenser;

Fig. 3 is a top plan view of my dispenser with the upper cover removed for the sake of better illustration;

Fig. 4 is a vertical sectional view showing my dispenser in the charging or filling position;

Fig. 5 is a vertical cross-sectional view showing the arrangement of parts within my dispenser when the metering chamber is filled and the dispensing cycle about to start;

Fig. 6 is a view similar to Figs. 4 and 5 showing the arrangement of parts during the discharging portion of the cycle of operation;

Fig. 7 is a vertical sectional view similar to Figs. 4, 5 and 6, but showing the arrangement of parts after discharge has stopped, and after the piston has started downwardly in the filling portion of the cycle of operation; and, Fig. 8 is an enlarged view, partly in section, of certain valve details, taken on line 8—8 of Fig. 4.

Referring more particularly to the disclosure in the drawings, a dispensing housing is depicted in which the numeral 10 designates the main cylinder positioned in the dispensing housing. At its lower end this is provided with a cylindrical bore to accommodate the piston adapted for reciprocation therein. At its lower end, cylinder 10 is provided with a head portion 11. The head portion in turn is provided with a flanged member 12, so as to provide a threaded engagement for the main beer or beverage supply pipe, and adapted to communicate with this pipe, is the liquid inlet opening 13.

At its upper end, cylinder 10 is provided with a portion of increased diameter, 14. Within the inner wall of this portion of cylinder 10 is provided a spiral screw or thread-like groove 15. At its extreme upper end, cylinder 10 is provided with the end wall or flange 16.

Adapted to slide within the bore of cylinder 10 and to selectively pass over various portions of groove 15, is the vertically movable sleeve 18. It is to be understood that the groove 15 must be so proportioned that as sleeve 18 passes upwardly over the grooved portion, there will be left an annular spiral passageway around the outside of sleeve 18, substantially as illustrated in Figs. 4 through 7.

Sleeve 18 is adjusted and held in its adjusted position by rod 19, which is threaded at its lower end, as at 20, to engage an inwardly directed boss 21 formed as part of, or secured to, sleeve 18. At its upper end, rod 19 is enlarged, preferably to a rectangular section 22, and provided with a rack gear on one face. This rack gear operatively engages gear 24. Gear 24, in turn, is adapted for revolution by the external hand wheel 25.

In order to prevent beer under pressure from working out along shaft 19 I provide a sleeve 26 which is normally pressed snugly into the cover and mounting plate 27, and seats on suitable packing rings so as to provide a leak-proof joint. At its lower end, sleeve or tube 26 is provided with packing at 28, and a gland or stuffing box nut 30, through which rod 19 passes and is adapted to slide, as it must, during the various settings of sleeve 18.

Adapted to enclose the upper end of cylinder 10, to reduce the volume of liquid that can be put into cylinder 10, and to further provide liquid-free space for certain operating parts, I provide the stepped cylindrical member 32, which forms a centrally disposed cavity within cylinder 10, and co-axially therewith. Member 32 is provided at its upper end with a flange 33 which, seating on a suitable gasket, is held securely to flange 16 of cylinder 10, as by bolting thereto, and provides a leak-proof joint at this point, preventing the passage of the fluids being dispensed, even though they be under considerable pressure.

At its lower end, member 32 is provided with a reduced diameter portion 34, which provides a seat at 35 for the spring which actuates the piston. The side walls of portion 34 also serve as a centering and guiding means for the relatively heavy piston spring 36. Secured to head 37 on member 32 I provide a packing gland, wherein packing material 38 may be suitably compressed by the packing nut or cap 40. This construction provides a working stuffing box for piston extension 42 and prevents the flow of fluid along this extension as the same works back and forth through the packing material.

At its lower end, piston extension 42 joins with the principal piston part or plate 43. Plate 43 is perforated with a plurality of openings 44 and 45. Snug engagement with the inner wall or bore of cylinder 10 is provided by a piston cup 46. This member may be made of rubber, neoprene, plastic, or similar suitable materials, and is ring-like in structure with a downwardly extending lip or cup, so that as pressure is applied to the same, from the lower portion of cylinder 10 as viewed, it will tend to form a very secure seal. Cup 46 is held in position by the lower piston plate 48, which is secured to the upper piston plate 43 by a plurality of screws as shown. These screws seat in bosses 50, which extend downwardly below the lower surface of plate 48 and form downward stops for the plate, holding it at all times off of head 11, so as to provide for the easy entrance of fluid beneath the piston.

At its central portion, plate 48 is provided with a valve seat 51, in which piston valve 52 is adapted to seat at certain portions of the cycle of operation of my device.

Secured to, and extending upwardly through piston extension 42, is the valve stem 53. The movement of fluid under pressure up, along and around stem 53 is prevented by means of the downwardly directed packing, of the lip or cup type preferably, as 54. Packing 54 is held securely in place with sufficient pressure for smooth operation by the diaphragm cup 55 which is threaded to the piston extension at 56.

Secured to the upper surface of cup 55, as by threading thereto, is a cover cap 58. This cover co-acts with cup 55 to provide a seat for the flexible diaphragm 60. Diaphragm 60 is provided with an upwardly extending ball controlling plug portion 61 and is normally held in its upward position by means of compression spring 62, which through a terminal cap 63 tends at all times to keep valve stem 53 and diaphragm 60 in the uppermost position.

On its upper face, cap 58 is provided with an upward extension which forms a loose guide for plug 61, and co-axially therewith is provided the vent 65, and pressure line 66 is taken off below the ball seat, the purpose of which will best be understood under ethe discussion of operation. Vent 65 is adapted to be periodically closed by ball 67, when the same is carried upwardly by plug 61, vent 65 and ball 67 forming a relief valve.

Adjustably secured to an extension of cap 58 is a trip rod 68. This trip rod is provided with an increased diameter at its upper end so as to provide the abutting face 70. This increased diameter portion of rod 68 extends upwardly out of the upper enclosing case and is provided with, preferably, a knurled hand nut 71.

Co-axially disposed above valve stem 53 and ball 67 is the quantity adjusting screw 72. This screw is graduated at 74 to indicate varying quantities of delivery and at its lower end is threaded at 75, so that by turning the knurled hand nut 76, the appropriate line 74 may be brought into registry with an index and the amount of fluid to be delivered can be accurately predicted.

Formed as part of, or secured to, screw 72 is a downwardly extending pin or detent 77, which is adapted to pass through opening 65 and dislodge ball 67 from its seat when the piston assembly has been forced upwardly by the fluid under pressure and against the downward pressure exerted by spring 36. This adjustment actually controls the upward limit of movement of the dispensing piston assembly 43.

Member 72 is positioned by being screwed into a threaded sleeve 78. Sleeve 78 is urged upwardly and prevented from turning about its axis by spring 79 anchored at 80, which also causes lugs 81 to firmly engage the cover plate. Lugs 81 pass through appropriate slots in the cover plate 27 and the entire sleeve is partially revolved so that they will have metal for a firm bearing.

Disposed below cover plate 27 and secured thereto, is the gas admission valve or air admission valve assembly. This unit consists of a lower pressure chamber 83 which is supplied with air or gas, depending upon which is used in the keg of liquid being dispensed, through the flexible tube 84, which in turn connects to the rigid tube 85 which leads to the source of gas pressure. The upper end of pressure chamber 83 is sealed by a rigid plate 86 which serves also as a seat for valve 88. Disposed above plate 86 is an upper pressure chamber 90. The upper wall which seals pressure within chamber 90 is in the form of a flexible diaphragm 91. Diaphragm 91 has a lower extension 92, and an upper extension 94, secured to it. Lower extension 92 provides means for engaging, in operative arrangement, valve 88; whereas the upper extension 94 provides a bearing point for lever 96. Connected to pressure chamber 90 is a gas exit line 97. The gas or air carried out through tube 97 has two branches, branch 98 leading to the means for operating valve 52, and branch 99 leading to the means for operating the discharge outlet of the device from which the fluid is dispensed. Figure 8 shows the relation of the gas exit line 97 and branch 98 with the upper pressure chamber 90.

Lever 96 is pivoted at 100 as a fixed fulcrum, and extends to the left as viewed where it is engaged by a cam pin 101 secured to lever 102. Lever 102 is mounted for partial revolution about the fixed pivot 104. It is this lever 102 which, acting through the sequence of parts, initiates the inflow of gas or air under pressure through valve 88 and which, in turn, promotes the functioning of the entire dispenser.

The final fluid discharge valve 106 is mounted directly over the discharge orifice 107 and is contained, along with its associated mechanism, within a unit casting 108, which is suitably secured to the main body of the dispensing unit. Valve 106 is formed preferably of yieldable material and is provided with a diaphragm 110 which is held in place by a retainer 111 and some convenient means for locking the same in place, as lock ring 112. Downward pressure is maintained on valve 106 by spring 114, one end of which is fixedly supported by retainer 111, while the other end bears directly upon the the body of valve 106.

Axially disposed with respect to valve 106, and adapted to pass therethrough, is valve stem 116. This member is provided with an axially disposed bore 136, which terminates at its upper end with a radially disposed opening 118. A washer-like member secured to the upper end of the valve stem, as 120, forms in effect an auxiliary discharge valve, which is normally urged into tight engagement with the valve seat 121, by means of the compression spring 122.

Entering the upper chamber which houses spring 122, and which of course is fluid tight, is the bleed-off line 124. This line is secured and communicates with the upper portion of the liquid receiving cavity of this dispensing device, and being attached at the uppermost point, it can be used to draw off any excess of air or gas that may accumulate above the liquid, or it may be used to draw a very small jet of liquid if the same should be desired for increasing the foam in a dispensed glass of beverage, for instance.

The bleeding valve assembly, consisting of units 118, 120, 121, and 122, is housed within a cage 126, and cage 126, in turn, is fixedly secured to lever 128 which is pivoted, as is lever 96, at 100.

Intermediate its ends, lever 128 is provided with a discharge diaphragm 130, the central portion of which is supported on a pedestal 131 which, in turn, is secured to the upper plate 27 of the dispenser cylinder. The upper rim of this yieldable diaphragm is fixedly secured to the lever by suitable clamp means as shown, and entering the chamber thus formed by the diaphragm, is a gas or air supply line 99, the control of which has been previously described. This construction has for its function the raising of discharge valve 106, which will be achieved when air or gas pressure is introduced within the chamber formed by diaphragm 130.

When it is desired to draw off any accumulation of gas or air above the liquid in the cylinder, or to draw off a little liquid for freshening purposes, the exterior hand button 135 may be depressed, thus mechanically actuating lever 128 and causing it to be depressed about pivot 100. This action forces downwardly the movable cage 126. Tube 124 leading off, as it does, from the uppermost point of the beer storage chamber, conducts the air into the upper enclosed chamber of member 126 where, when the cage is depressed, an opening is formed between members 120 and 121, so that air or gas may find its way through the radially disposed opening 118 and thence out through axial bore or auxiliary discharge tube 136 of valve stem 116.

A totalizer 141 is secured to the outer housing cap 142 and operatively connected to lever 96, so as to give a record of each cycle of operation.

*Method of operation*

For simplifying the description of the operation of my dispenser, I prefer to consider it from a standpoint of dispensing beer, although it should be understood that the device will properly measure, dispense and provide proper foam levels on any gas-charged or effervescent liquid.

In operation, beer from the keg is led through suitable tubing to fitting 12, where it passes through opening 13 into the cylinder proper. Considering the showing in Fig. 4, the beer can flow in past the open valve 52, out through discharge openings 44 and 45, until it entirely fills all that portion of cylinder 10 below the sealing gasket, which forms a seal between the cylinder casting proper and flange 33 of member 32. At its upper end, of course, the chamber is restricted to an annular chamber, the outer wall of which is formed by the enlarged diameter portion 14 of the cylinder casting 10. Before operation is attempted, the machine is allowed to fill, and then by the operation of hand button 135, the air or gas accumulating in the upper portion of the beer cavity is drawn off so that the entire device is full of liquid beer under whatever pressure the keg may have imposed upon it.

In normal operation it has been found desirable in the interest of uniform operating conditions, to provide an outside source of either gas or air for the beer keg under pressure to supplement the gas normally included in the beer itself. A branch of this air or gas line leads up to the machine, as tube 85.

Having performed these initial steps which normally occur only when a new keg is tapped, the machine is now ready to draw beer. Dispensing is achieved by having the beer glass or vessel into which beer is to be drawn, or the operator's hand, move the depending end of lever 102 in toward the machine. This operation, through lever 96, depresses the air valve 88 allowing gas to pass into the upper cavity 90 of the air supply valve unit. In free communication with chamber 90 is tube 97, which is provided with two branches, first, tube 98 which leads the gas to the chamber above diaphragm 60, secondly, the gas is also available through tube 99 which conducts the same to the cavity formed above diaphragm 130. At this point, it is desirable to point out that the arrangement of parts about diaphragms 60 and 130, respectively, should be such that diaphragm 60 will operate with less pressure than diaphragm 130.

As diaphragm 60 is forced downwardly, it compresses spring 62 and a continuous movement closes valve 52 in its seat 51. In the drawings, this condition has been attained in Fig. 5.

During the period when valve 52 is closing, pressure is building up in diaphragm 130 and as the diaphragm is fixedly supported by pedestal 131, the end result is to raise lever 128 by revolving it about the fixed pivot 100. The continued lifting of the left hand end, as viewed, of lever 128 carries with it valve stem 116 and valve 106 which is carried upwardly against compression spring 114. When valve 106 opens, cylinder 10 which has been charged with beer under pressure, now provides an avenue of escape for the beer, and the pressure on the beer above cylinder piston assembly 43 being less than that of the keg pressure supplied below the piston and further, owing to the fact that valve 52 is held in its closed position by the air pressure applied to diaphragm 60, the entire piston assembly, together with piston extension 42 and the associated parts carried within the diaphragm cup 55, move upwardly as an assembly against the pressure exerted by spring 36.

During the dispensing cycle, which is best illustrated in Fig. 6, the beer is forced through the spiral passageway 15 which is formed by sleeve 18 covering up the separating walls between the various legs of groove 15 and thus creating at the will of the operator a passageway 15 of any length within the range of the machine.

The flow of beer is compelled out through outlet nozzle 107 under urgence of the pressure applied to the beer keg. The rate of flow, however, will be governed by the amount of spiral groove 15 that is covered by sleeve 18. The portion of the spiral groove covered by sleeve 18 forms a restricted passage through which the beer must flow. The greater the length of restricted passage through which the beer must flow, the greater the reduction of pressure at the outlet nozzle, and consequently there is consummated a means for controlling, adjustably, at the will of the operator, the amount of foam that will be produced when the beverage is liberated into the glass or container. This is a very important factor in the useful operation of my dispenser, as it also takes into account the fact that not only turbulence or pressure creates foaming, but also the ability of beer to retain included gas is a function of its temperature, and while the pressure applied to the keg can be maintained by automatic control means, it is not so of the temperature of the keg, particularly in an establishment that is busy, and new kegs of beer must be substituted for consumed ones and the new keg may have considerable difference in temperature from the one that was just dispensed.

When variations and conditions are encountered as indicated above, the operator makes an adjustment by means of hand wheel 25, and repositions sleeve 18 so as to increase or decrease the length of the spiral groove 15 through which the new beer must travel before being liberated to atmospheric pressure. Thus, in hand wheel 25 we have a means for adjusting the amount of foam that will be formed on the discharged beer so as to make it conform to the standard practice of the serving establishment. In addition to controlling the foaming of the beer, it is desirable to have the machine so arranged that it can measure exact amounts of liquid beer. This is achieved by providing the quantity governing hand knob 76, which functions to position detent 77, and its position is shown by the graduations at 74, giving the operator a definite index as to the exact amount of liquid beer being dispensed.

During the dispensing operation, ball 67 has been seated to close opening 65. This seating occurred during the period illustrated in Fig. 4, where the upward extension of diaphragm 60 (plug 61) forced ball 67 up into its seat and it was held there until air pressure through tube 98 took over and continued to hold the ball seated, even though extension 61 was retracted as air pressure forced diaphragm 60 downwardly.

When the piston assembly and associated parts have reached the determined upper limit of travel, detent 77 engages ball 67 through opening 65 and forces it off its seat. First, the gas pressure passing through tube 98 is dissipated out through opening 65, reducing the pressure on the upper side of diaphragm 130 and allowing spring 114 to take control of valve 106 and seat it, thus interrupting the flow of beer. A further drop in pressure on diaphragm 60 allows spring 62 to lift valve 52 from its seat.

As a result of this sequence of operation, we now have a position as illustrated in Fig. 7, wherein equal pressure is maintained on both sides of piston 43 owing to the fact that valve 52 is open permitting free flow of beer through openings 51, 44 and 45 and, as a result, compression spring 36 now takes control of the assembly and forces it downwardly to the position shown in Fig. 4.

Normally, lever 102 is restored to its inoperative position by diaphragm 91 or other suitable means at the end of the cycle. If, however, it is desired to have continuous operation without the necessity of operating lever 102 but once, adjuster 71 can, by the threaded adjustment provided, be so positioned that at the end of the piston return stroke to the bottom position, abutment 70 can be made to engage lever 96 and to thus re-operate the air admission valve 88, starting a new cycle of operation automatically. This operation will continue until member 71 is so adjusted as not to contact lever 96. The operation will continue until this adjustment is disengaged.

The volume drawn for each cycle of operation is controlled by quantity control 76, which controls the vertical position of release detent 77. The threaded sleeve 78 is held in its uppermost position by spring 79 which is positioned to have a considerable amount of movement. If it is desirable to stop the discharge of beer at any point, downward pressure applied to control 76 will force this entire assembly downward until detent 77 engages ball 67, thus interrupting the cycle of operation, as a limit stop.

It will be apparent, it is believed, from the above description and disclosure in the drawings, that this invention comprehends a novel construction for a dispenser for gas-charged liquids, which is simple and positive in operation and extremely sanitary.

The entire machine can be cleaned by flushing and in this instance sleeve 18 is adjusted to its uppermost position so that water under considerable pressure can be put through the spiral tube 15 to thoroughly clean the entire threaded portion of the cylinder. Discharge is then made out through discharge opening 138 if casting 108 is entirely removed from the machine, or by suitable means valve 106 can be opened and the flushing continued and discharged out through discharge opening 107.

Having thus described my invention, I claim:

1. In a dispenser of the type adapted to measure and dispense effervescent liquids stored under pressure, a dispensing housing having a main cylinder therein; a piston disposed for reciprocation in said cylinder; said cylinder having an inlet opening, at one end of the path of said piston, to be connected to the source of liquids; spring means secured to said cylinder and positioned to force said piston toward said inlet opening; a piston valve carried by said piston; a gas admission valve to be connected to a source of gas under pressure; means for operating said piston valve connected to said gas admission valve having spring means tending to open said piston valve and having gas-operated means to close said piston valve when said gas admission valve is opened; means adapted to open said gas admission valve; said dispensing housing having a spirally disposed annular discharge passage connected to said main cylinder on the opposite side of said piston from said inlet opening; means for varying the length of said annular passage; and means for releasing the gas from said gas-operated means to close said piston valve, when the piston has traveled an adjustable predetermined distance away from said inlet opening, thereby permitting said spring means tending to open said piston valve, to open said piston valve and permitting said spring means secured to said cylinder, to move said piston toward said inlet opening.

2. The subject matter of claim 1 in which said spirally disposed annular discharge passage is formed by a first member which has a spirally disposed open annular groove and by a second member in the form of a sleeve positioned to form a wall and close said groove; and in which said means for varying the length of said annular passage is means for changing the position of said first and second members so that said sleeve will cover more or less of said open annular groove to vary the length of the passage formed by the two members.

3. In a dispenser of the type adapted to measure and dispense effervescent liquids stored under pressure, a dispensing housing having a main cylinder therein; a piston disposed for reciprocation in said cylinder; said cylinder having an inlet opening, at one end of the path of said piston, to be connected to the source of liquids; spring means secured to said cylinder and positioned to force said piston toward said inlet opening; said dispensing housing having a spirally disposed annular discharge passage connected to said main cylinder on the opposite side of said piston from said inlet opening, said passage being formed by a first member which has a spirally disposed open annular groove and by a second member in the form of a sleeve positioned to form a wall and close said groove; means for changing the position of said first and second members so that said sleeve will cover more or less of said open annular groove to vary the length of the passage formed by the two members; passageway means connecting opposite sides of said piston and valve means operable to block said passageway means; and valve control means for said valve means operating to open said valve means when said piston has moved a pre-determined adjustable distance away from said inlet opening by the force of liquid coming through said inlet opening, thereby permitting liquid on the inlet opening side of said piston to pass to the other side of said piston and thereby allowing the piston to be moved toward said inlet opening by the force of said spring means.

4. In a dispenser of the type adapted to measure and dispense effervescent liquids stored under pressure, a dispensing housing having a main cylinder therein; a piston disposed for reciprocation in said cylinder; said cylinder having an inlet opening, at one end of the path of said piston, to be connected to the source of liquids; spring means secured to said cylinder and positioned to force said piston toward said inlet opening; a piston valve carried by said piston; a valve stem on said valve; a diaphragm cup positioned on the end of said valve stem and secured to said piston; a spring positioned in said cup to bear on said valve stem and force said piston valve to an open position; a diaphragm positioned in said cup and connected to said valve stem to force said piston valve to a closed position when said diaphragm is expanded; a gas admission valve to be connected to a source of gas under pressure, said gas admission valve being connected to said diaphragm cup in position so that gas passing through said gas admission valve will expand said diaphragm and close said piston valve; means for operating said gas admission valve; and a discharge passage in said dispensing housing connected to said main cylinder on the opposite side of said piston from said inlet opening.

5. The subject matter of claim 4 in which there is a discharge valve connected to said discharge passage; in which there is a discharge diaphragm connected to said discharge valve, said discharge diaphragm being connected to said gas admission valve in a manner that gas from said gas valve will expand said diaphragm and operate said discharge valve.

6. The subject matter of claim 5 in which there is an auxiliary discharge tube passing through said discharge valve and connecting with said main cylinder; in which there is an auxiliary discharge valve in said auxiliary discharge tube and in which there is operating means for said auxiliary discharge valve.

7. The subject matter of claim 4 in which there is a relief valve in said diaphragm cup and in which there is a detent positioned in said cylinder in position to open said relief valve when the piston has traveled a pre-determined distance from said inlet opening.

8. The subject matter of claim 4 in which said discharge passage in said dispensing housing is spirally disposed and annular, said passage being formed by a first member which has a spirally disposed open annular groove and by a second member in the form of a sleeve positioned to form a wall and close said groove; and in which there is means for changing the position of said first and second members so that said sleeve will cover more or less of said annular groove to vary the length of the passage formed by the two members.

9. The subject matter of claim 3 in which there is an auxiliary discharge tube passing from said main cylinder to the discharge end of said spirally disposed annular discharge passage, in which there is an auxiliary discharge valve in said auxiliary discharge tube and in which there is operating means for said auxiliary discharge valve.

THOMAS A. HUTSELL.

REFERENCES CITED

The following references are of record in the file of this patent:

UNITED STATES PATENTS

| Number | Name | Date |
| --- | --- | --- |
| 1,754,138 | Agee | Apr. 8, 1930 |
| 2,420,708 | Hutsell | May 20, 1947 |